United States Patent
Hartigan et al.

[11] Patent Number: 6,125,509
[45] Date of Patent: Oct. 3, 2000

[54] ROTATION DEPENDENT FRICTIONAL HINGE MECHANISM

[75] Inventors: Michael J. Hartigan, Boca Raton; Michael P. Goldenberg, Del Rey, both of Fla.

[73] Assignee: Motorola, Inc., Schaumburg, Ill.

[21] Appl. No.: 08/980,565

[22] Filed: Dec. 1, 1997

[51] Int. Cl.[7] .................................................. E05D 11/08
[52] U.S. Cl. ............................ 16/337; 16/341; 16/342; 403/92; 403/103
[58] Field of Search ........................ 16/337, 341, 342; 403/92, 103, 104

[56] References Cited

U.S. PATENT DOCUMENTS

| | | | |
|---|---|---|---|
| 2,534,779 | 12/1950 | Lane et al. | 16/341 |
| 2,700,139 | 1/1955 | Jewell | 16/341 |
| 5,165,145 | 11/1992 | Sherman | 16/341 |
| 5,178,481 | 1/1993 | Kawamura | 16/337 |
| 5,715,576 | 2/1998 | Liu | 16/341 |

FOREIGN PATENT DOCUMENTS 13222  6/1907  United Kingdom ................ 16/341

*Primary Examiner*—Anthony Knight
*Assistant Examiner*—Mark Williams

[57] ABSTRACT

An electronic device (10) has a foldable housing (11) including a base unit (12) and a cover unit (14). The cover unit is rotatably joined to the base unit by a hinge mechanism. Within cover unit is a frictional hinge mechanism including a cam member (30), a cam follower (32) and an o-ring (34). The cam member has an attachment post (38) connected to an attachment gear on base unit such that the cam member is fixed to the base unit. The cover unit rotates against noticeable friction produced by o-ring rubbing between cover unit and cam member while cover unit is at angles of rotation larger than a pre-set angle, and cover unit rotates against minimal friction at angles of rotation smaller than the pre-set angle. The friction allows cover unit to maintain a multiplicity of positions with respect to base unit within a preselected range of angles larger than pre-set angle.

6 Claims, 8 Drawing Sheets

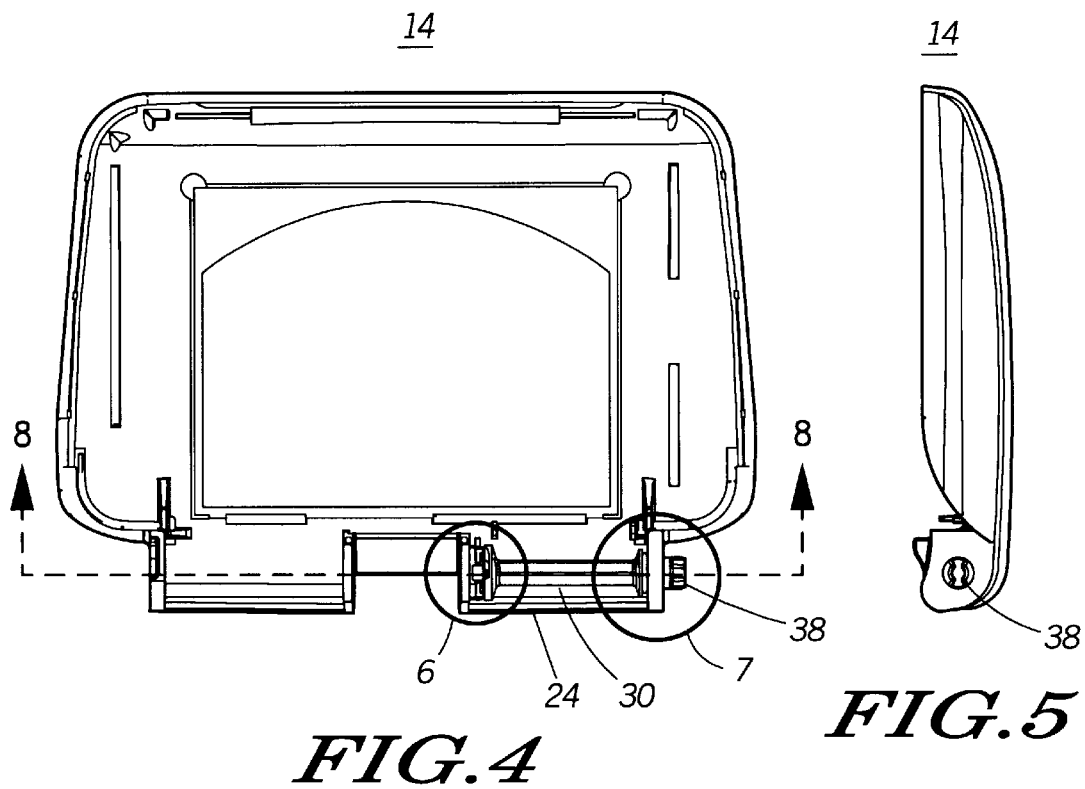
*FIG.4*  *FIG.5*
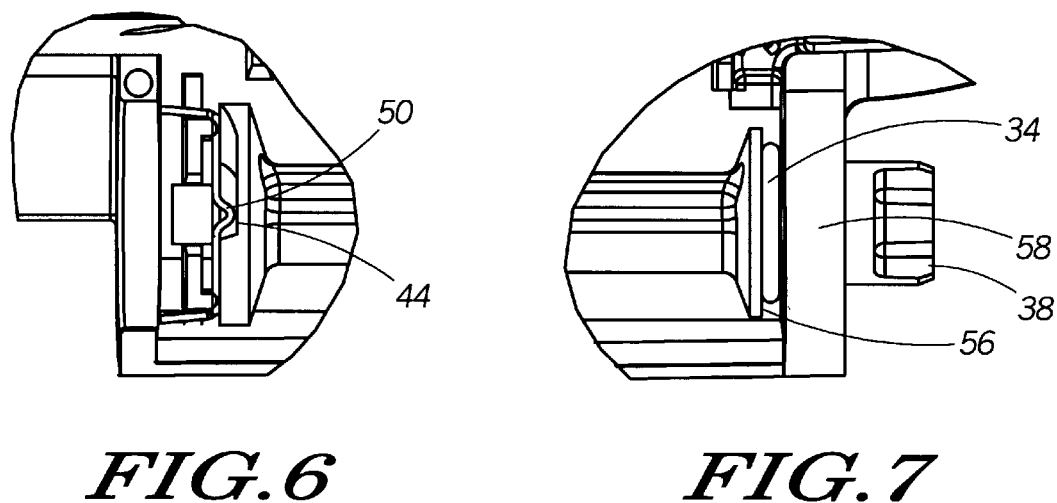
*FIG.6*  *FIG.7*

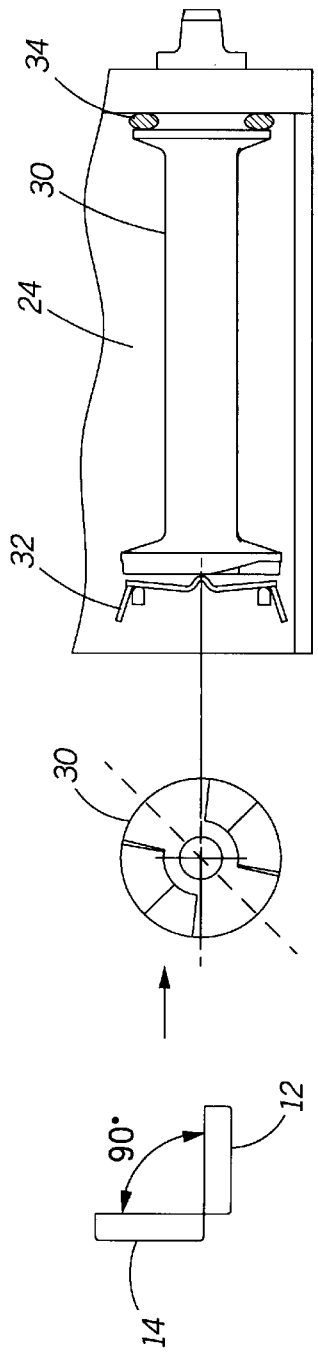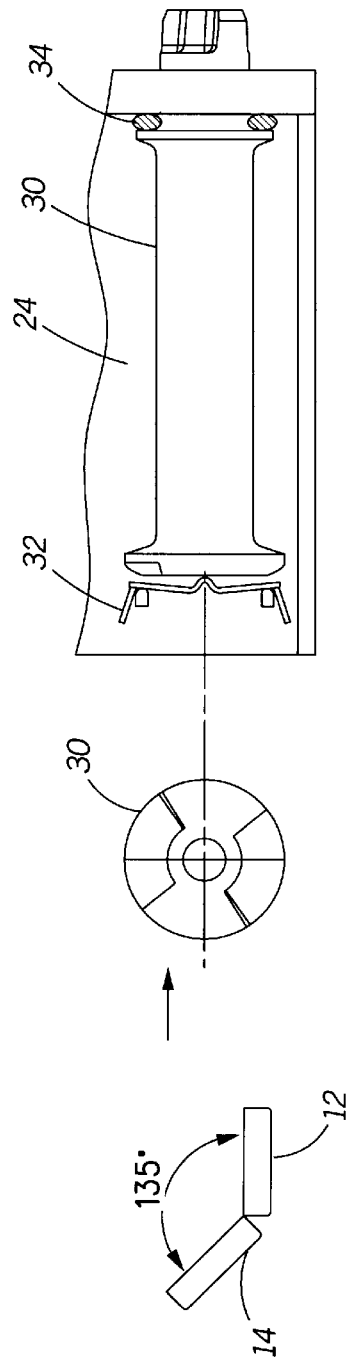

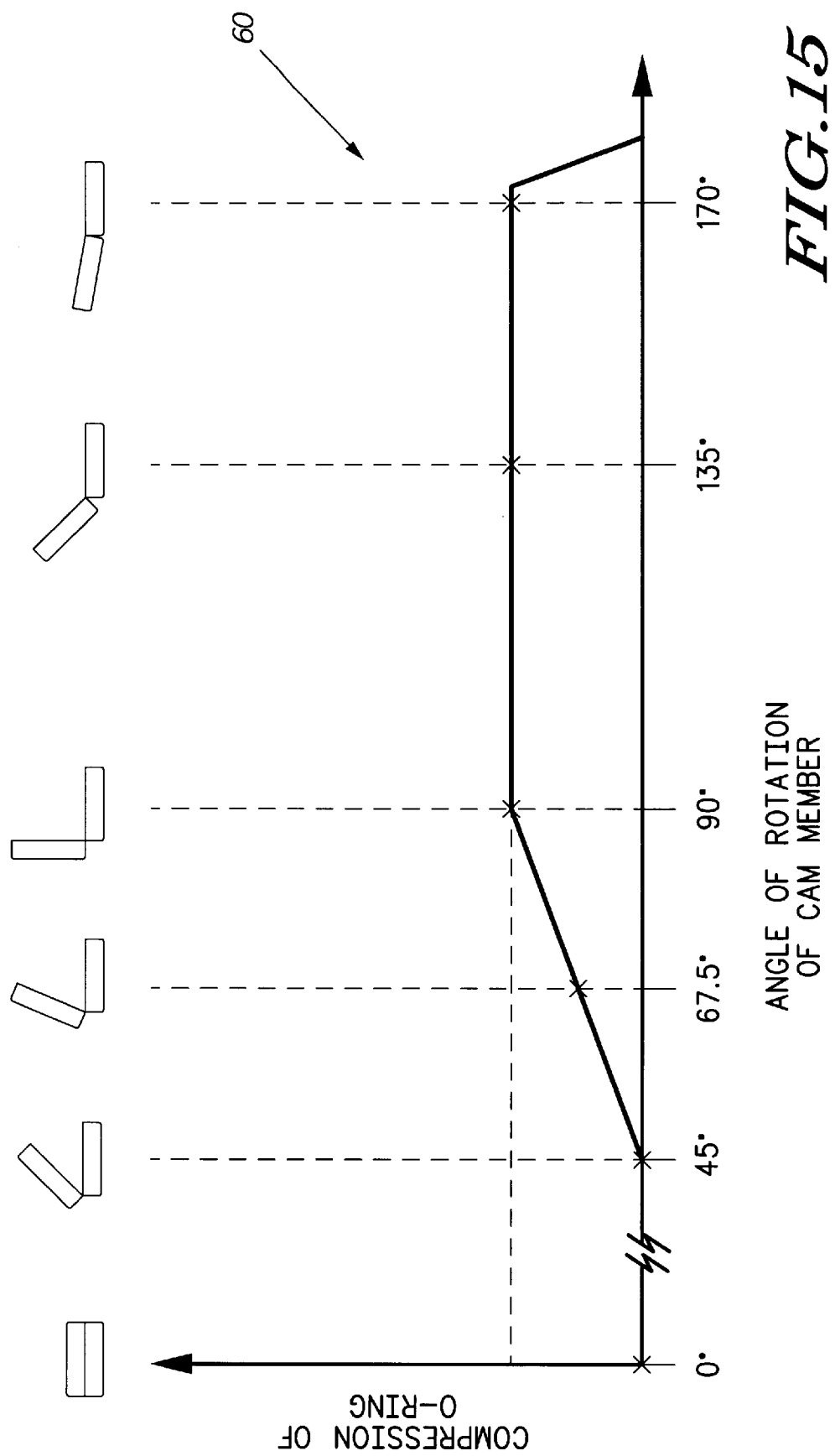

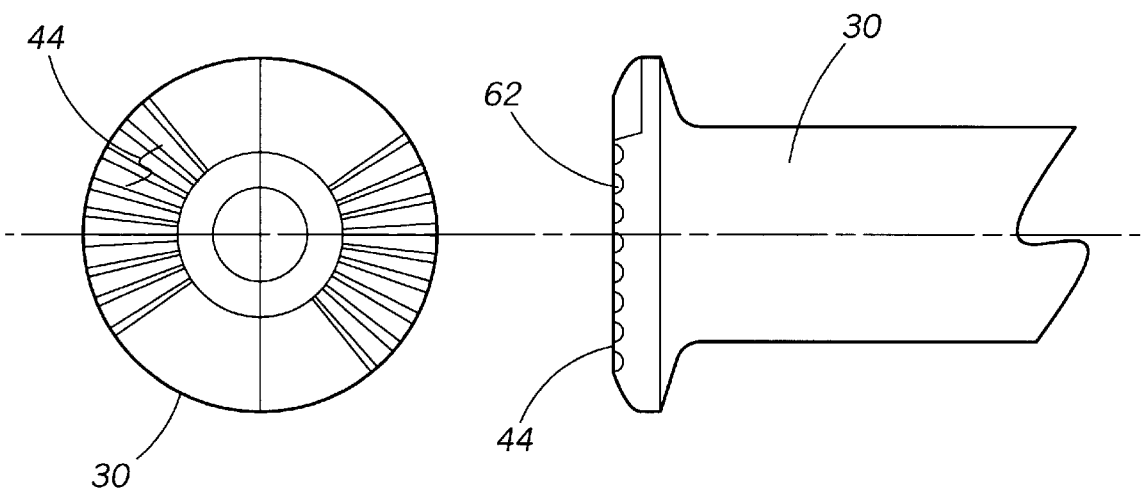
*FIG.16*  *FIG.17*

ROTATION DEPENDENT FRICTIONAL HINGE MECHANISM

FIELD OF THE INVENTION

This invention is directed to the field of foldable electronic devices, and more particularly to electronic devices that use a hinge mechanism to control the folding action between a base unit and a cover unit.

BACKGROUND OF THE INVENTION

Electronic devices such as selective call transceivers sometimes have a two-part housing that includes a base unit and a cover unit. The base unit typically houses most of the electronics, and the cover unit folds over the base unit. The cover unit typically contains a display.

A hinge mechanism is typically used to mechanically couple the cover unit to the base unit. The hinge mechanism allows the cover unit to be rotated from a closed position (in which the cover unit covers the base unit) to an opened position. Some electronic devices have a hinge mechanism that is biased in some way in order to allow opening of the cover unit with little friction to a pre-set, partially opened position and for maintaining the cover unit at that pre-set position. The typical hinge mechanism includes a cam member that rotates relative to a single spring on which the cam member bears. When the cover unit is manually opened somewhat, the force generated by the spring being deflected by the cam member urges the cover unit into a normally opened position and then tends to hold it in that position.

Electronic devices such as foldable wireless telephones typically have a pre-set, opened position for using the telephone, and they lack provision for remaining opened in any position other than the pre-set position. Some such electronic devices have a foldable housing that allows a user to open the cover unit to a plurality of positions more fully opened than the pre-set position. However, such known foldable housings disadvantageously lack provision for the cover unit to maintain itself at any of the more fully opened positions.

Electronic devices such as foldable portable computers typically lack a pre-set, opened position; instead, they have a frictional mechanism that allows the cover unit to be set at a plurality of positions with respect to the base unit.

Thus, what is needed is a frictional, hinge mechanism that has a pre-set position, and that allows low-friction rotation of the cover unit between the closed position and the pre-set position while also allowing constant high-friction rotation of the cover unit between the pre-set position and a multiplicity of positions more fully opened than the pre-set position. What is also needed is a frictional hinge mechanism that provides sufficient friction to prevent unwanted movement of the cover unit relative to the base unit at the pre-set position and also at any of a multiplicity of more fully opened positions, with the friction being apparent to the user only when the cover is rotated beyond the pre-set opened position.

BRIEF DESCRIPTION OF THE DRAWINGS

FIG. 4 is a bottom view of a cover unit of the foldable housing.

FIG. 5 is a right side view of the cover unit.

FIG. 6 is an enlarged bottom view of a portion of the frictional hinge mechanism shown in FIG. 4.

FIG. 7 is an enlarged bottom view of another portion of the frictional hinge mechanism shown in FIG. 4.

FIGS. 10–14 are front views and side views of the frictional hinge mechanism in various rotational and translational positions, next to pictorial representations of the foldable housing.

FIG. 15 is a cam profile chart of the frictional hinge mechanism with pictorial representations of the foldable housing in a closed position and in various opened positions.

FIG. 16 is a front view of an alternative embodiment of a cam member of the frictional hinge mechanism.

FIG. 17 is a side view of an alternate embodiment of a cam member of the frictional hinge mechanism.

DESCRIPTION OF THE PREFERRED EMBODIMENT

Figure 1:
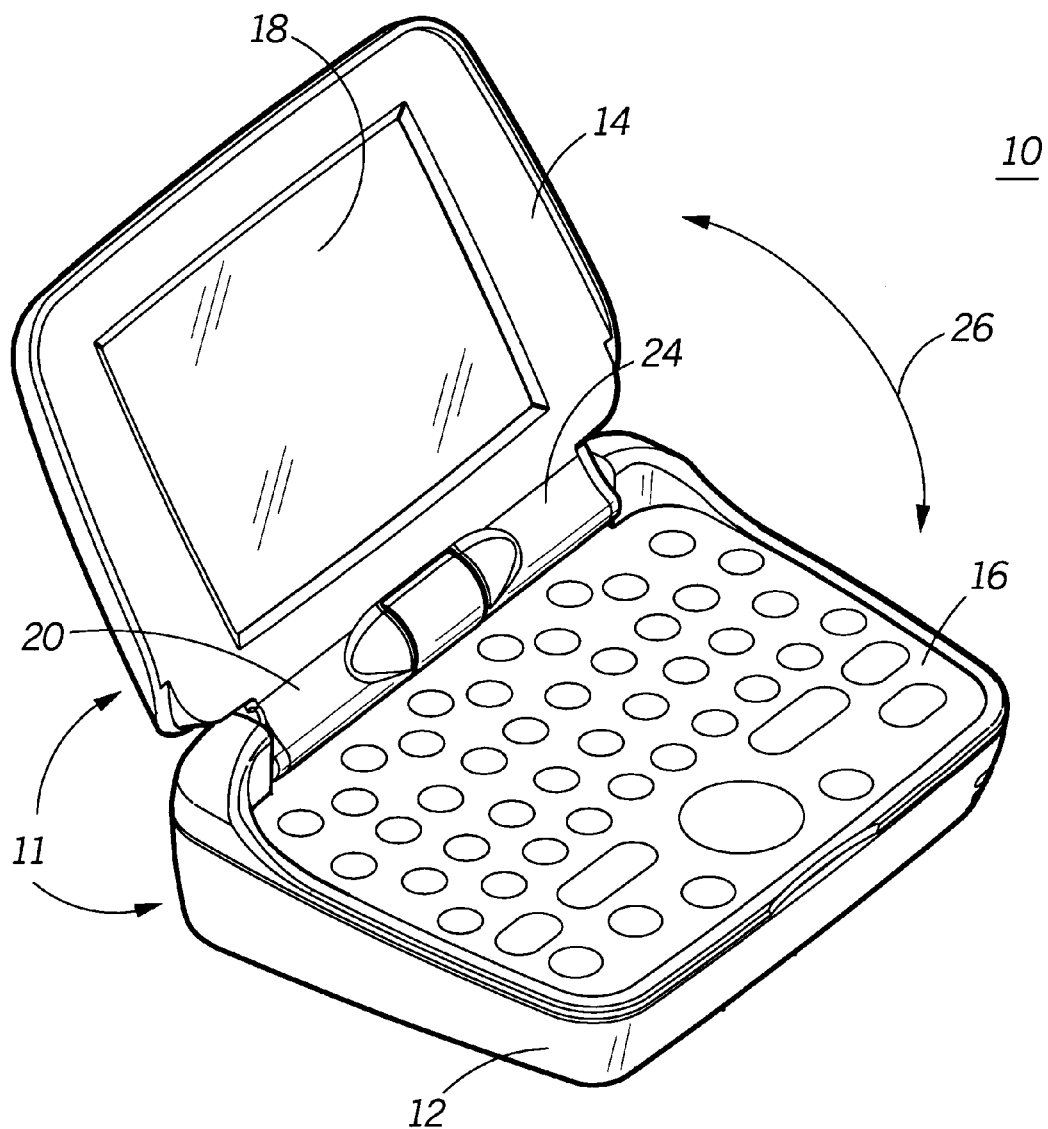
FIG. 1 is a perspective view of an electronic device that has a foldable housing in accordance with the invention.

Referring to FIG. 1, an electronic device 10 is shown in the form of a selective call transceiver capable of two-way radio frequency communication. The electronic device 10 has a foldable housing 11 that includes a base unit 12 and a cover unit 14. The base unit 12 encloses electronic circuitry and includes a keyboard 16 for use in composing a message that is to be transmitted by the electronic device 10. The cover unit 14 carries a display 18 that shows incoming messages and outgoing messages being composed by the user of the electronic device 10.

The cover unit 14 carries a rigid extension that forms two receptacles 20 and 24. The receptacle 24 is hollow and holds a hinge mechanism (not shown) that is discussed in U.S. patent application Ser. No. 08/807970, filed Mar. 3, 1997, by Hartigan et al., entitled Foldable Housing for an Electronic Device, which is assigned to the assignee of the present invention and which is hereby fully incorporated by reference herein. The hinge mechanism allows the cover unit 14 to be: reliably and firmly held in a closed position; snapped open to a pre-set opened position for viewing the display 18; and adjusted from the pre-set opened position to a variable read position to permit a user to read the display 18 at a comfortable viewing angle. These functions are accomplished using components that are within receptacle 24.

Mechanisms in the receptacles 20 and 24 couple the cover unit 14 to the base unit 12 so as to permit the cover unit 14 to rotate (in the direction of arrow 26) between its illustrated position and a closed position in which it covers the keyboard 16. In a pre-set opened position, the cover unit is opened at an angle of about 90° relative to the base unit.

The electronic device 10 is usually worn in a holster that is attached to the user's belt. The electronic device 10, when in the holster, is held in an orientation that allows the user to flip the cover unit to the pre-set opened position to read an incoming message. This action places the cover unit 14 essentially parallel to the ground, with the display 18 facing upwardly where it can be viewed by the user while the electronic device 10 is still in its holster.

To compose and send a message, the user will usually remove the electronic device 10 from its holster and hold the base unit in both hands to use the keyboard. If the cover unit is in the opened position (the cover unit opened about 90° relative to the base unit), the display 18 may not be at a comfortable viewing angle to the user. Accordingly, the hinge mechanism permits the cover unit to be opened further (beyond 90°) against a relatively small holding force until the cover unit is in a "read" position, starting at about 105° from the base unit and continuing to about 170° from the base unit.

When the cover unit has been rotated to the beginning of the read position, the hinge mechanism generates a relatively small holding force to resist further rotation of the cover unit. This holding force is sufficient to hold the display at a selected viewing angle, yet allowing the user to easily adjust the position of the display. The feel generated by the hinge mechanism within the read region is like a soft, continuous detent that permits the cover unit to be easily moved and stopped at any desired position within the read region.

In order to supplement the relatively small holding force produced by the hinge mechanism within receptacle 24, the electronic device 10 in accordance with the invention also has a frictional hinge mechanism within receptacle 24. The frictional hinge mechanism produces friction noticeable to the user only when the cover unit is rotated greater than about 90° with respect to the base unit.

Figure 2:
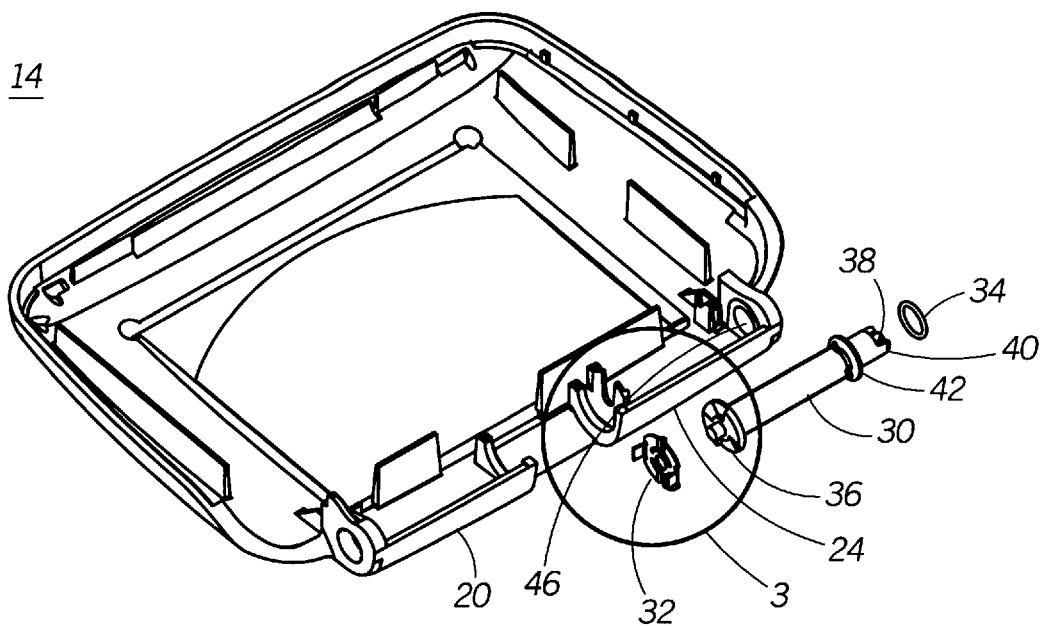
FIG. 2 is an exploded view of a frictional hinge mechanism in accordance with the invention use in the foldable housing shown in FIG. 1.

Referring now to FIG. 2, an exploded view of the cover unit 14 is shown without the display 18 shown in FIG. 1. The receptacle 20 is shown without any mechanism. The receptacle 24 is shown with a cam member 30, a cam follower 32, and an o-ring 34 in exploded positions. The cam member 30 has a cam surface 44 (see FIG. 3) at a first end 36, an attachment post 38 at a second end 40 for mating with an attachment gear (not shown) on the base unit 12, and a radially extending flat surface 56 at an intermediate position 42 between the first end and the second end. The cam member 30, the cam follower 32 and the o-ring 34 fit within the receptacle when assembled, except for a portion of the cam member near the second end 40 that protrudes through an opening 46 in the receptacle.

Figure 3:
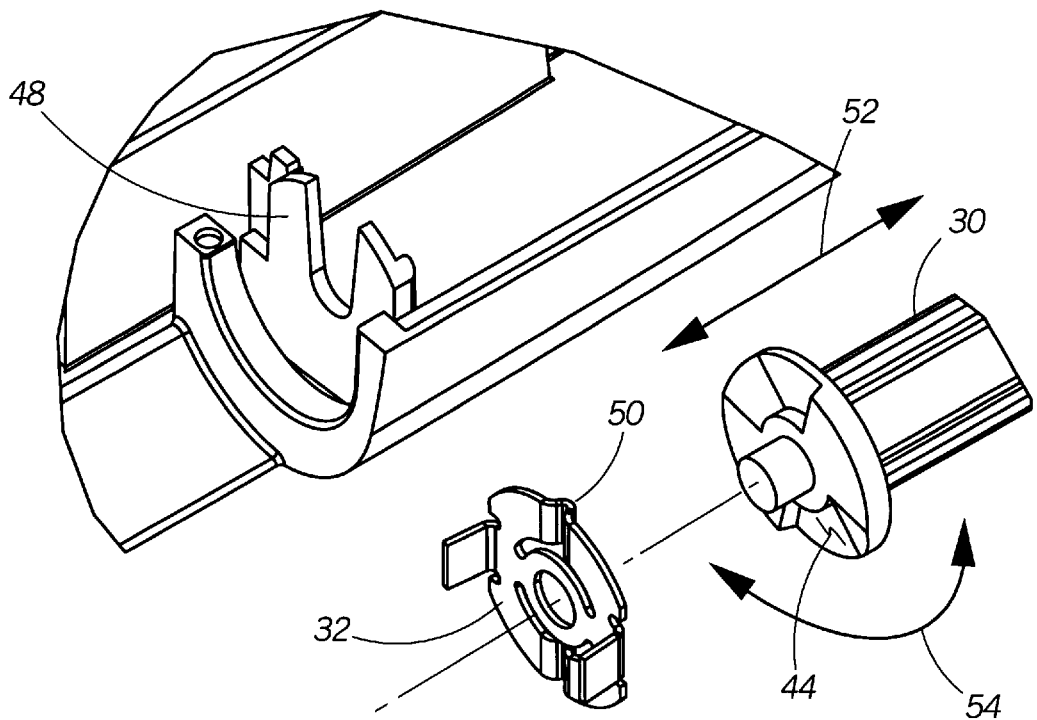
FIG. 3 is an enlarged view of a portion of FIG. 2 showing details of a portion of the frictional hinge mechanism.

Referring now to FIG. 3, a more detailed view of area "3" in FIG. 2, there is shown a mount 48 on the cover unit 14 for mounting the cam follower 32. The cam member 30 has a cam surface 44 at the first end 36. The cam follower 32 is fixed to the cover unit and is sized and adapted to mate with the cam surface 44. A lobe 50 on the cam follower 32 continuously bears upon the cam surface 44 and causes translational movement (in a direction indicated by arrows 52) of the cam member in response to relative rotational motion (in a direction indicated by arrows 54) between the cam member and the cam follower. The o-ring 34 is sized and adapted to mate with the flat surface radially extending flat surface 56 at the intermediate position 42. The cam member 30 compresses the o-ring 34 in response to the translational movement of the cam member toward the o-ring. The compression of the o-ring produces frictional torque for resisting the rotational movement of the cam member relative to the cover unit, thereby resisting rotational movement of the base unit 12 relative to the cover unit 14. Preferably, the foldable housing is composed of plastic; however, many other types of materials can be used. Preferably, the o-ring is composed of rubber; however, other materials having an appropriate coefficient of friction can be used.

FIG. 4 is a bottom view of the cover unit 14 of the foldable housing 11, shown without the display 18 shown in FIG. 1.

FIG. 5 is a right side view of the cover unit 14 showing the attachment post 38 for mating with an attachment gear (not shown) on the base unit 12 such that there is no relative movement between the cam member 30 and the base unit 12.

FIG. 6 is an enlarged bottom view of area "6" of the frictional hinge mechanism shown in FIG. 4 showing the lobe 50 of the cam follower 32 interacting with the cam surface 44 of the cam member 30 such that there is minimal deflection of the cam member in the direction of the o-ring 34.

FIG. 7 is an enlarged bottom view of area "B" of the frictional hinge mechanism shown in FIG. 4 showing a side view of the flat surface 56 on the cam member 30 and showing the o-ring 34 predisposed between the radially extending flat surface 56 on the cam member and a right side 58 of the receptacle 24. As there is minimal deflection of the cam member in the direction of the o-ring 34 (see FIGS. 4 and 6), the o-ring is shown not compressed in FIG. 7.

Figure 8:
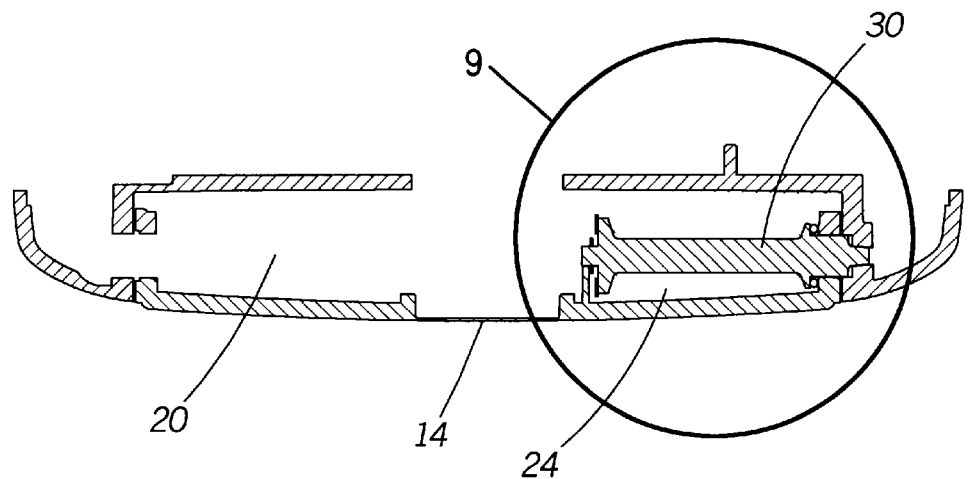
FIG. 8 is a cross-sectional view of the foldable housing through cut line 8—8 of FIG. 4.

FIG. 8 is a cross-sectional view of the foldable housing through cut line 8—8 of FIG. 4.

Figure 9:
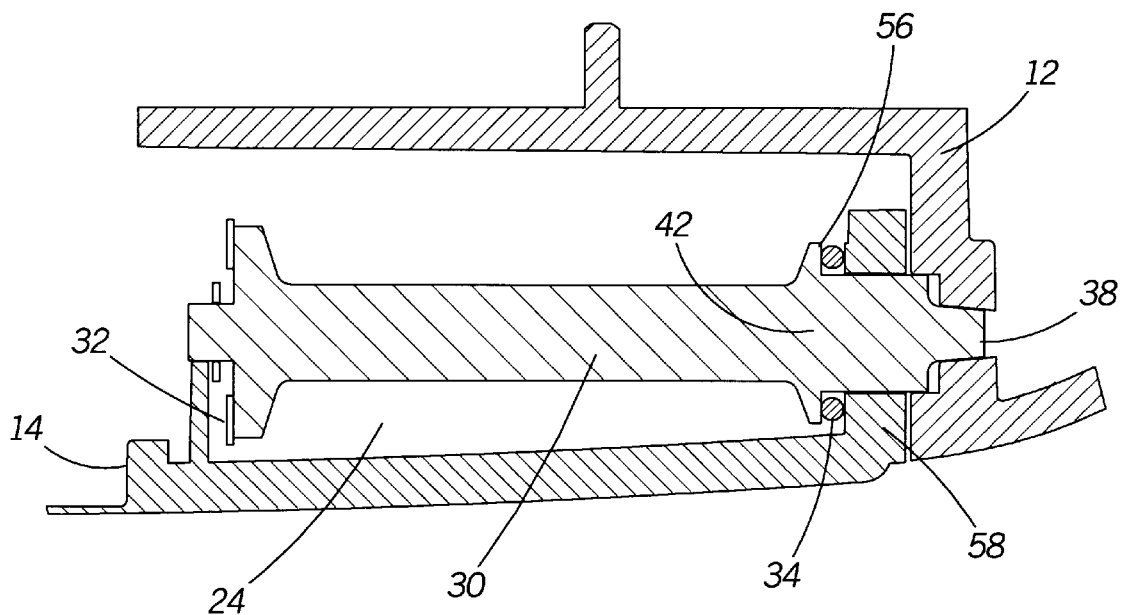
FIG. 9 is an enlarged view of a portion of the cross-sectional view of FIG. 8.

FIG. 9 is an enlarged view of area 9 of the cross-sectional view of FIG. 8 showing the cam follower 32 and the o-ring 34.

Figure 10:
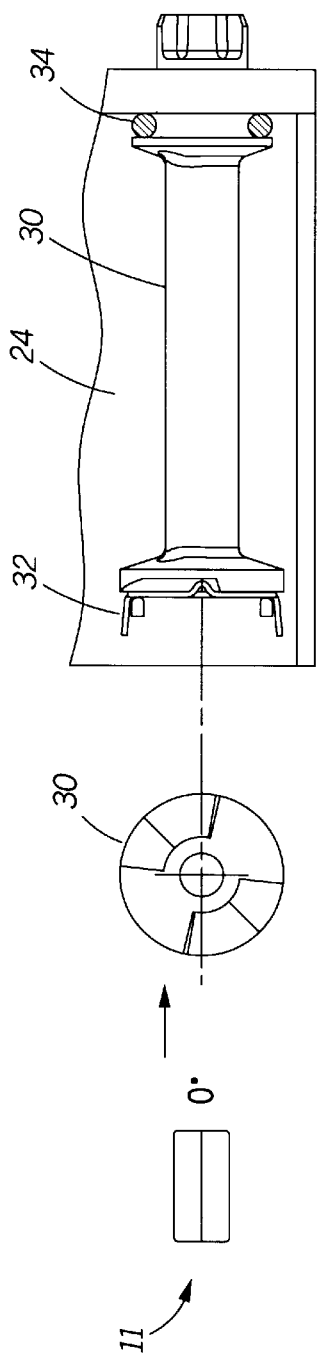

FIGS. 10–14 are front views and side views of the cam member 30 of the frictional hinge mechanism in various positions corresponding to various positions of the cover unit 14 with respect to the base unit 12, next to pictorial representations of the various positions the foldable housing 11. FIG. 10 shows the position of the cam member when the cover unit is closed. In this position, the cam member is minimally moved in the direction toward the o-ring, and, consequently, the o-ring is minimally compressed. Advantageously, in this position, the frictional hinge mechanism does not produce a noticeable amount of friction toward resisting movement of the hinge mechanism.

Figure 11:
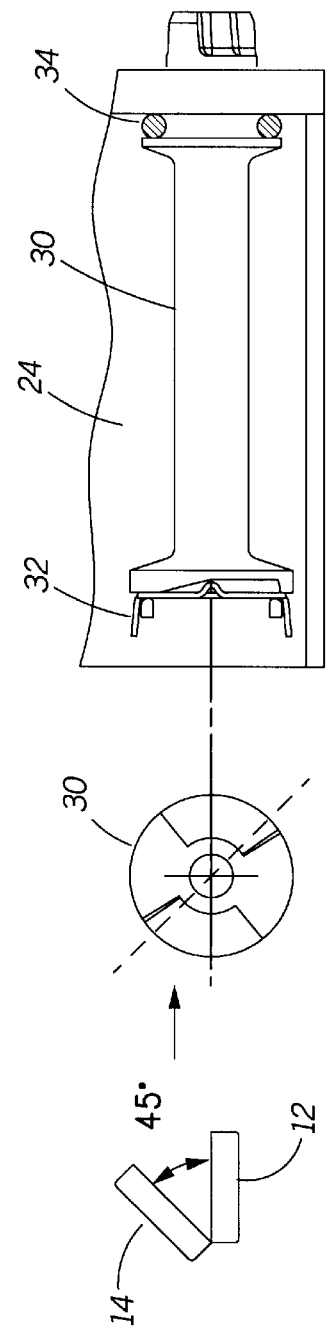

FIG. 11 shows the position of the cam member when the cover unit 14 is at a 45° angle with respect to the base unit 12. In this position, the cam member is minimally moved in the direction toward the o-ring, and, consequently, the o-ring is minimally compressed. Advantageously, in this position, the frictional hinge mechanism does not produce a significant amount of friction toward resisting movement of the hinge mechanism. Beginning at the 45° position, the lobe 50 encounters a slope on the cam surface 44 and movement of the cam member in the direction toward the o-ring begins. At positions greater than 45°, the frictional hinge mechanism begins to produce a significant amount of friction; however, due to the sloping cam surface, advantageously the amount of friction increases only gradually.

Figure 12:
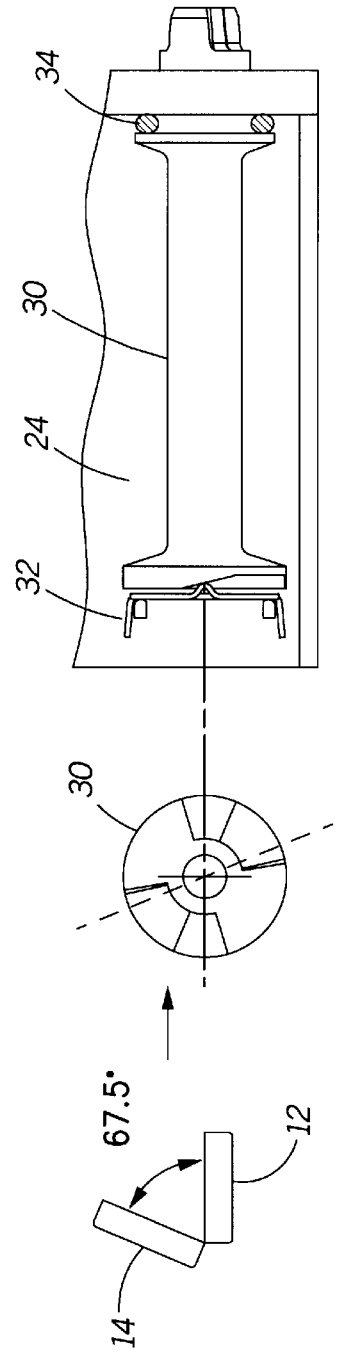

FIG. 12 shows the position of the cam member when the cover unit 14 is at a 67.5° angle with respect to the base unit 12. In this position, the cam member is noticeably moved in the direction toward the o-ring, and, consequently, the o-ring is partially compressed. In FIGS. 10 and 11, the cross-section of the o-ring is circular. In FIG. 12, the cross-section of the o-ring is slightly oval, but its oval shape is exaggerated for illustrative purposes. In this position, the frictional hinge mechanism produces a significant amount of friction toward resisting movement of the hinge mechanism; however, advantageously, the friction at this position is difficult for a user to notice because of the momentum of the cover unit toward the pre-set opened position caused by the hinge mechanism within receptacle 24. The gradually increasing friction being produced by the frictional hinge mechanism within receptacle 24 between 45° and 90° gradually slows the movement of the cover unit caused by the hinge mechanism.

FIG. 13 shows the position of the cam member when the cover unit 14 is at a 90° angle with respect to the base unit 12. In this position, the cam member is considerably moved in the direction toward the o-ring and, consequently, the o-ring is fully compressed. The friction produced by the o-ring being squeezed between the flat surface 56 and the right side of the receptacle 24 resists movement of the base unit—cam member combination with respect to the cover unit when the foldable housing is opened to the pre-set opened position of about 90° and to positions greater than 90°.

FIG. 14 shows the position of the cam member when the cover unit 14 is at a 135° angle with respect to the base unit 12. In this position, the cam member continues to be considerably moved in the direction toward the o-ring and, consequently, the o-ring 34 is fully compressed. A user can move open the foldable housing to any desired position in the range of about 90° to about 135° and the frictional torque produced by the o-ring advantageously maintains the desired position.

It should be noted that the cam follower 32 deflects slightly when the lobe 50 bears upon portions of the cam surface 44 closer to the cam follower, as shown (somewhat exaggerated) in FIGS. 13 and 14. In FIGS. 13 and 14, the cross-sectional of the o-ring 34 is indeed more substantially oval than in FIG. 12; however, the oval shape is exaggerated for illustrative purposes.

FIG. 15 is a cam profile chart 60 of the frictional hinge mechanism with pictorial representations of the foldable housing in a closed position and in various opened positions. The horizontal axis represents the angle of rotation in one of the directions indicated by arrow 26 in FIG. 1. The vertical axis represents the amount of compression of the o-ring. The frictional torque that restricts movement of the cover unit with respect to the base unit is proportional to the compression of the o-ring. The graph shows that there is virtually no compression when the angle between the cover unit and the base unit is less than about 45°, and that the compression gradually increases between 45° and 90°, and that the compression reaches the maximum amount at about 90° and maintains the maximum compression to about 135°. The shape of the foldable housing prevents rotation to angles greater than a fully opened position of about 170°.

An alternative embodiment of the cam member 30 is shown in FIGS. 16 and 17. To create a different feel while a user adjusts the position of the cover unit 14 to positions beyond the pre-set position, the cam surface 44 is modified either by adding material to create bumps on the cam surface or by removing material to create dimples 62 on the cam surface. Either variation would create small detents so that, instead of continuous friction, there would be a finite number of positions beyond the pre-set position. The detents would also aid in holding the cover unit 14 in the selected position.

Although the invention has been described in terms of a preferred embodiment, it will be obvious to those skilled in the art that many alterations and variations may be made without departing from the invention. Accordingly, it is intended that all such alterations and variations be considered as within the spirit and scope of the invention as defined by the appended claims.

We claim:

1. A foldable housing for an electronic device, comprising:

a base unit having an attachment gear; and a cover unit having a hinge mechanism for rotatably coupling the cover unit to the base unit, the hinge mechanism including a cam member having a cam surface at a first end, an attachment post at a second end mating with the attachment gear and a radially extending flat surface at an intermediate position, a cam follower fixed to the cover unit and sized and adapted to mate with the cam surface, the cam follower bearing upon the cam surface and causing translational movement of the cam member in response to relative rotational motion between the cam member and the cam follower, and an o-ring sized and adapted to mate with the flat surface, the cam member compressing the o-ring against a side of the cover unit in response to the translational movement of the cam member toward the o-ring, compression of the o-ring producing frictional torque for resisting rotational movement of the cover unit relative to the cam member, thereby resisting rotational movement of the cover unit relative to the base unit.

2. The foldable housing for an electronic device of claim 1, wherein the frictional torque is produced in an amount proportional to amount of translational movement.

3. The foldable housing for an electronic device of claim 1, wherein the o-ring is compressed between the flat surface and the cover unit.

4. A electronic device having a base unit and a cover unit having an attachment gear hingely coupled to the base unit, comprising:

a cam member having a cam surface at a first end, an attachment post at a second end mating with the attachment gear, and a radially extending flat surface at an intermediate position;

a cam follower fixed to the cover unit and size and adapted to mate with the cam surface, the cam follower bearing upon the cam surface and causing translational movement of the cam member in response to relative rotational motion between the cam member and the cam follower; and an o-ring sized and adapted to mate with the flat surface, the cam member compressing the o-ring in response to the translational movement of the cam member toward the o-ring, compression of the o-ring producing frictional torque for resisting rotational movement of the cam member relative to the cover unit, thereby resisting rotational movement of the base unit relative to the cover unit.

5. The electronic device of claim 4 in which the cover unit and the base unit are rotatable between a closed position to a fully opened position with a pre-set opened position intermediate the closed position and the fully opened position.

6. The electronic device of claim 5 in which the frictional torque produced during rotation between the closed position and the pre-set opened position is less than the frictional torque produced during rotation between the pre-set opened position and the fully opened position.

* * * * *